United States Patent Office 3,156,730
Patented Nov. 10, 1964

3,156,730
REDUCTIVE CONDENSATION PROCESS
Jack Kwiatek and Irving L. Mador, Cincinnati, Ohio, assignors to National Distillers and Chemical Corporation, New York, N.Y., a corporation of Virginia
No Drawing. Filed Dec. 29, 1960, Ser. No. 79,123
2 Claims. (Cl. 260—601)

The present invention relates to a novel reductive condensation process for direct production of high molecular weight aldehydes from saturated aliphatic aldehydes containing an alpha hydrogen atom and mixtures of such aldehydes with other aldehydes. More particularly, the invention relates to a novel process for production, from lower molecular weight saturated aliphatic aldehydes containing an alpha hydrogen atom, of aldehydes having twice the number of carbon atoms of the starting aldehyde. In a specific embodiment, the invention relates to the direct production of α-methylvaleroaldehyde from propionaldehyde, α-ethylcaproaldehyde from n-butyraldehyde, etc.

In accordance with this invention, a saturated aliphatic aldehyde containing an alpha hydrogen atom or a mixture thereof with other aldehydes, is reacted in liquid phase with an aqueous basic solution containing cobalt ions and cyanide anions in presence of hydrogen to produce higher molecular weight aldehydes.

The reaction is carried out, preferably, under an elevated hydrogen pressure, such as from about one to about 1000 p.s.i., in an aqueous reaction mixture that, preferably, has a pH of from about 7 to about 13.

Although, in specific embodiment, the invention is described herein with particular reference to propionaldehyde, n-butyraldehyde, and mixtures of benzaldehyde-acetaldehyde as the starting aldehyde, other saturated aliphatic aldehydes may be used which, for example, include the higher saturated aliphatic aldehydes such as isovaleraldehydes, caproaldehyde, caprylaldehyde, and, generally, such aldehydes of up to ten carbon atoms.

As aforesaid, mixtures of aldehydes may be employed, in which case at least one of the aldehydes has an alpha hydrogen atom. Examples of such mixtures include isobutyraldehyde - acetaldehyde, benzaldehyde-acetaldehyde, and benzaldehyde-caprylaldehyde, and others.

As aforesaid, the reaction is carried out in liquid phase and, suitably, at room temperature or above for the lower molecular weight aldehydes (e.g. propionaldehyde) and at higher temperatures, such as above 50° C., for butyraldehyde and higher aldehydes. Thus, and depending on the particular aldehyde reactant that is employed, the reaction may be carried out over a rather wide temperature range, such as from about 0° to about 180° C., and, as aforesaid, higher temperatures are employed with increasing chain length and with greater chain branching of the aldehyde reactant.

For carrying out the aforesaid reaction, the cobalt ions are provided in the reaction mixture by use of a water-soluble salt of cobalt. For that purpose, cobalt salts of organic or inorganic acids may be used, for example, salts such as the chloride, nitrate, sulfate, carbonate, acetate, etc. Regarding the cyanide anions, they are provided in the reaction mixture preferably by use of water-soluble alkali metal cyanides.

In preferred embodiments, the cyanide anions are provided by use of sodium cyanide, or potassium cyanide, and mixtures thereof.

Although the ratio of cyanide anions to cobalt ions present in the reaction mixture may be varied, the invention is generally carried out using a ratio of from about two to about ten cyanide anions per cobalt ion and, more preferably, from about five to six cyanide anions per cobalt ion, such ratios being obtained by appropriate use of the required amounts of the cobalt salt and cyanide.

In the process of this invention, the cobalt ion functions as a catalyst and, hence, only catalytic amounts thereof are required based on the starting aldehyde. Thus, although the amount of cobalt ion utilized for practice of the catalytic process embodied herein can be varied, the process is generally carried out using a concentration of from about 0.001 mole to about 1.0 mole of cobalt ion per mole of the starting aldehyde and, more preferably, from about 0.1 mole to about 0.3 mole of cobalt ion per mole of the starting aldehyde.

In order to further describe the invention, the following embodiments are set forth for purposes of illustration and not limitation.

Example I

A solution of potassium cyanide (0.153 mole) in 100 ml. water was added to a mixture of cobaltous chloride (0.03 mole) in 125 ml. water and propionaldehyde (0.139 mole) under hydrogen (one atmosphere pressure). A total of 2113 ml. of hydrogen was absorbed in 3½ hours, after which time propionaldehyde (0.028 mole) was again added and further absorption of hydrogen occurred. An overall absorption of 2227 ml. of hydrogen in 4½ hours was obtained.

The reaction mixture was subjected to continuous ether extraction; the extract was dried over magnesium sulfate and distilled to yield 1.13 g. of α-methyl valeraldehyde. The α-methylvaleraldehyde was identified by its infra-red absorption spectrum and by comparison of its derivatives, 2,4 - dinitrophenyl - hydrazone and semicarbazone, as follows:

|  | Value Found | Lit Value |
|---|---|---|
| $n_D$ | 1.3913 (at 25°) | 1.3997 (at 20°) |
| 2,4-dinitrophenylhydrazone | M.P. 104–6° | M.P. 102–4° |
| Semicarbazone | M.P. 98–100° | M.P. 100–2° |

Example II

Into the glass liner of a Parr 1-liter bomb was introduced 0.05 mole of cobaltous chloride in 100 ml. $H_2O$, 0.255 mole of potassium cyanide and 0.1 mole potassium hydroxide in 35 ml. of water contained in a large test tube so arranged as to not mix with the cobaltous cyanide solution until the bomb is rocked, and 0.5 mole of n-butyraldehyde. The system was flushed with hydrogen, then pressured to 870 lbs. with hydrogen, and the rocker started. The temperature of the reaction mixture was brought to 125° C. and held there four hours, then the rocker was stopped and the mixture allowed to cool to room temperature. Total uptake of hydrogen was 170 pounds. Extraction of the mixture three times with 150 ml. portions of ether following by drying over $MgSO_4$, filtration, distillation of the ether, then distillation of the residue gave the following fractions:

(1) B.P. 140–61°, mostly 158–61°,
(2) B.P. to 144°/25 mm.

Fraction (1) weighed 19 grams and fraction (2) weighed 5.4 grams. The infra-red absorption spectrum of fraction (1) was practically identical to that of 2-ethylcaproaldehyde; the refractive index was found to be $n_D^{23}$ —1.416 (literature value $n_D$ —1.416) and the aforesaid boiling point compared to the 163° C. literature value for 2-ethylcaproaldehyde. The 2,4-dinitrophenylhydrazone of fraction (1) melted at 124–126° C. (literature value =121° C.).

Example III

Using the system described in Example I, using a ratio of CN/Co of 5.1/1, and the addition of 0.06 mole KOH;

injection of 5.5 cc. (0.1 mole) acetaldehyde and 31.83 g. (0.3 mole) benzaldehyde led to absorption of 989 ml. of hydrogen in 5½ hours. The reaction product was extracted three times with a total of 300 ml. of ether, dried over sodium sulfate, filtered and distilled. After removal of ether and lower boilers to 150°/0.15 mm., there was obtained 3.1 g. of an oil, B.P. 150–8°/0.15 mm. The 2,4-dinitrophenylhydrazone thereof melted at 209–210°, and the semicarbazone melted at 192–3° as compared to the reported constants for α-benzylcinnamaldehyde; B.P. 205–210°/5 mm., semicarbazone M.P. 187–8°. Analysis on the 2,4-dinitrophenylhydrazone gave the following results compared to calculated values:

|  | C, percent | H, percent | N, percent |
|---|---|---|---|
| Found | 65.28 | 4.439 | 13.48 |
| Calcd | 65.66 | 4.51 | 13.92 |

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A reductive condensation process for the direct production of higher molecular weight saturated aldehydes from lower molecular weight saturated aliphatic aldehydes containing an alpha hydrogen atom and having up to 10 carbon atoms which consists of reacting said lower molecular weight saturated aliphatic aldehyde containing an alpha hydrogen atom at a temperature of about 0° to 180° C. with an aqueous solution having a pH of from about 7 to 13 containing cobalt ions and cyanide anions in the presence of a hydrogen pressure of from about 1 to 1,000 p.s.i., said aqueous solution containing from about 2 to about 10 cyanide anions per cobalt ion and from about 0.001 to about 1 mole of cobalt ion per mole of the saturated aliphatic aldehyde containing an alpha hydrogen atom.

2. The process of claim 1 wherein the lower molecular weight saturated aliphatic aldehyde containing an alpha-hydrogen atom is selected from the group consisting of propionaldehyde, butyraldehyde and acetaldehyde.

References Cited in the file of this patent

UNITED STATES PATENTS

| 2,638,488 | Cerveny | May 12, 1953 |
| 2,658,083 | Burney et al. | Nov. 3, 1953 |
| 2,808,443 | Mertzweiller | Oct. 1, 1957 |
| 2,852,563 | Hagemeyer et al. | Sept. 16, 1958 |

FOREIGN PATENTS

| 831,823 | Great Britain | Mar. 30, 1960 |

OTHER REFERENCES

Advanced Organic Chemistry, Fieser and Fieser, page 467, copyright 1961.